United States Patent
Forster et al.

(10) Patent No.: US 11,463,356 B2
(45) Date of Patent: Oct. 4, 2022

(54) SYSTEMS AND METHODS FOR FORMING ON-PREMISE VIRTUAL PRIVATE CLOUD RESOURCES

(71) Applicant: Arista Networks, Inc., Santa Clara, CA (US)

(72) Inventors: Richard Forster, San Francisco, CA (US); Kanzhe Jiang, Los Altos Hills, CA (US); Sudeep Modi, Milpitas, CA (US); Shunjia Yu, San Jose, CA (US); Onkar Bhat, San Jose, CA (US); Ganesh Kasinathan, Milpitas, CA (US); Zhao Dong, Sunnyvale, CA (US); Weifan Fu, Santa Clara, CA (US); Jialiu Wang, Santa Clara, CA (US); Saadet Savas, San Jose, CA (US); Alan Hase, Campbell, CA (US); Alok Gupta, Cupertino, CA (US); Prashant Gandhi, San Jose, CA (US); Chi Chong, Fremont, CA (US); Jai Prakash Shukla, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 164 days.

(21) Appl. No.: 16/934,957

(22) Filed: Jul. 21, 2020

(65) Prior Publication Data

US 2021/0112000 A1     Apr. 15, 2021

Related U.S. Application Data

(60) Provisional application No. 62/914,898, filed on Oct. 14, 2019.

(51) Int. Cl.
*H04L 45/74* (2022.01)
*H04L 49/25* (2022.01)
(Continued)

(52) U.S. Cl.
CPC .......... *H04L 45/74* (2013.01); *H04L 41/0806* (2013.01); *H04L 49/25* (2013.01);
(Continued)

(58) Field of Classification Search
None
See application file for complete search history.

(56) References Cited

U.S. PATENT DOCUMENTS 10,333,849 B2 *   6/2019   Masurekar ............ H04L 45/586
11,196,591 B2 *   12/2021   Hira ........................ H04L 12/66
(Continued)

*Primary Examiner* — Robert M Morlan
(74) *Attorney, Agent, or Firm* — Treyz Law Group, P.C.; Tianyi He

(57) ABSTRACT

A packet forwarding network may include spine and leaf switches that forward network traffic between end hosts. The packet forwarding network may be implemented on multiple network racks in a rack-based system. A controller may control the underlying spine and leaf switches to form on-premise virtual private cloud (VPC) resources. In particular, the controller may form enterprise VPC (EVPC) tenants, each having a virtual router that performs routing between different segments within the corresponding EVPC tenant. The different segments may separately include web, application, and database servers, as end hosts. The controller may form a system VPC tenant having a virtual system router that performs routing between different EVPC tenants. A segment in an internal VPC tenant formed by the controller and/or an external VPC tenant formed by the controller may provide external network access for one or more of the EVPC tenants.

20 Claims, 10 Drawing Sheets

(51) Int. Cl.
*H04L 49/00* (2022.01)
*H04L 41/0806* (2022.01)
*H04L 67/10* (2022.01)
*H04L 61/50* (2022.01)

(52) U.S. Cl.
CPC .............. *H04L 49/70* (2013.01); *H04L 61/50* (2022.05); *H04L 67/10* (2013.01)

(56) References Cited

U.S. PATENT DOCUMENTS

| | | |
|---|---|---|
| 2015/0124823 A1 | 5/2015 | Pani et al. |
| 2015/0271303 A1 | 9/2015 | Neginhal et al. |
| 2016/0021032 A1 | 1/2016 | Maier et al. |
| 2022/0038311 A1* | 2/2022 | Shen ................ H04L 12/66 |

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ... | SEND TO PORT 4 |
| * | * | * | * | * | * | 80 | | DROP |

FIG. 4

SYSTEMS AND METHODS FOR FORMING ON-PREMISE VIRTUAL PRIVATE CLOUD RESOURCES

This patent application claims the benefit of provisional patent application No. 62/914,898, filed Oct. 14, 2019, which is hereby incorporated by reference herein in its entirety.

BACKGROUND

This relates to communication networks, and more particularly, to communications networks having network switches that are controlled by controller circuitry and/or management circuitry.

Packet-based networks include network switches. Network switches are used in forwarding packets from packet sources to packet destinations.

For some applications, a user can obtain a virtual private cloud (network) as a virtual workspace to host different network topologies and support different applications. However, these cloud networks are implemented on external public infrastructure (i.e., infrastructure that is external to the user's own infrastructure and shared with other unrelated entities). To increase compatibility with these external networks and allow for better user control, systems and methods for flexibly forming virtual private cloud resources on a user's own infrastructure or on any private infrastructure (e.g., for forming on-premise virtual private cloud resources) may be provided.

SUMMARY

In accordance with some embodiments, a (rack-based) networking system may include a plurality of end hosts (e.g., implemented on first and second network racks), switches (e.g., leaf and spine switches, physical and software switches, etc.) between the plurality of end hosts, and a controller coupled to and configured to control the switches. If desired, the software switch may be implemented using computing equipment on one of the first or second network racks. The controller may be configured to form a plurality of virtual private cloud (VPC) tenants based on providing configuration data (e.g., flow table entries) to the switches, and to form a system VPC tenant (sometimes referred to as a Transit Gateway) based on providing additional configuration data (e.g., additional flow table entries) to the switches. The plurality of VPC tenants may include an external VPC tenant having an external network connection (e.g., to an external network or the Internet through an external network physical router end host from a virtual router in the external VPC tenant via an external segment in the external VPC tenant) and internal VPC tenants. The system VPC tenant may be configured to route network traffic between the internal VPC tenants and the external network connection through the external VPC tenant. If desired, one or more internal VPC tenants may include a segment for external network connection instead of or in addition to the external network connection through the external VPC tenant.

The controller may be configured to form a corresponding virtual router for each VPC tenant in the plurality of VPC tenants, and the virtual routers may be implemented in a distributed manner across the switches (e.g., may be implemented by corresponding routing tables or flow tables at the switches). The controller may also be configured to form a virtual system router for the system VPC tenant, and the virtual system router may also be implemented in a distributed manner across the switches (e.g., may be implemented by a different corresponding routing table or flow tables at the switches).

In accordance with some embodiments, a method of operating controller circuitry to control a network implemented in a (rack-based) system may include: with the controller circuitry, controlling a plurality of underlying switches in the network to form a first VPC tenant having a first virtual router implemented on at least one switch in the plurality of underlying switches; with the controller circuitry, controlling the plurality of underlying switches to form a second VPC tenant having a second virtual router implemented on at least one switch in the plurality of underlying switches; and with the controller circuitry, controlling the plurality of underlying switches to form a system VPC tenant having a virtual system router with first and second interfaces connected respectively to the first and second virtual routers. The method may further include, with the controller circuitry, controlling the plurality of underlying switches to form a segment within the first VPC tenant, the segment being implemented on at least one switch in the plurality of underlying switches.

The segment may be associated with a first subnet and may be connected to an interface of the first virtual router (e.g., may be associated with or be defined by a routing table stored in network elements in the network). The plurality of underlying switches may include a switch having a segment identification module, a hardware address-based (e.g., MAC address-based) forwarding module to forward network packets within the segment, a virtual router identification module (sometimes referred to as a first routing table association module associated with subnets or for tenants), an Internet Protocol address-based (IP address-based) forwarding module configured to route network packets across the first VPC tenant, a virtual system router identification module (sometimes referred to as a second routing table association module associated with tenants or for gateways), and a policy-based (e.g., access control list-based) forwarding module configured to forward (e.g., route) network packets across the network.

Controlling the plurality of underlying switches to form the segment may include providing configuration data that identifies virtual ports of the segment distributed across ports of the plurality of underlying switches to the segment identification module. Controlling the plurality of underlying switches to form the first VPC tenant may include providing configuration data that identifies the interface of the first virtual router (sometimes referred to as an association to a corresponding routing table) to the virtual router identification module. Controlling the plurality of underlying switches to form the system VPC tenant may include providing configuration data that identifies the first and second interfaces of the virtual system muter (sometimes referred to as first and second associations to a corresponding routing table) to the virtual system router identification module.

In accordance with some embodiments, a non-transitory computer-readable storage medium (e.g., for controller circuitry, for switch management circuitry, for switch circuitry, etc.) may include instructions for: configuring switches coupled between a plurality of end hosts to form a VPC tenant by configuring the switches to form a network segment associated with a subnet and by configuring the switches to form a virtual router that includes an interface associated with the network segment; configuring the switches 10 form a system VPC tenant by configuring the switches to form a virtual system router that includes an interface associated with the virtual router; configuring the switches to form an external VPC tenant by configuring the switches to form an additional virtual router that includes an interface for external network access; configuring the switches to form a first additional network segment associated with a first additional subnet within the VPC tenant; and configuring the switches to form a second additional network segment associated with a second additional subnet within the VPC tenant. The network segment may be connected to a first end host implementing an applications server, the first additional network segment may be connected to a second end host implementing a web server, and the second additional network segment may be connected to a third end host implementing a database server. If desired, the non-transitory computer-readable storage medium may include instructions for configuring the switches to form an additional external network segment in the VPC tenant.

Further features of the present invention, its nature and various advantages will be more apparent from the accompanying drawings and the following detailed description.

BRIEF DESCRIPTION OF THE DRAWINGS

FIG. 4 is a diagram of an illustrative flow table of the type that may be used by a packet processing, system showing three illustrative types of packet forwarding that may be performed based on the flow table entries of the flow table in accordance with some embodiments.

DETAILED DESCRIPTION

Networks such as the internet and the local and regional networks that are coupled to the internee rely on packet-based switches. These switches, which are sometimes referred to herein as network switches, packet processing systems, or packet forwarding, systems can forward (e.g., perform switching and/or routing functions on) packets based on address information. In this way, data packets that are transmitted by a packet source may be delivered to a packet destination. Packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server (sometimes referred to herein as controller circuitry or management circuitry) may interact with each of the control clients over respective network links. The use of a cross-platform controller and corresponding controller clients allows potentially disparate network switch equipment to be centrally managed.

Figure 1:
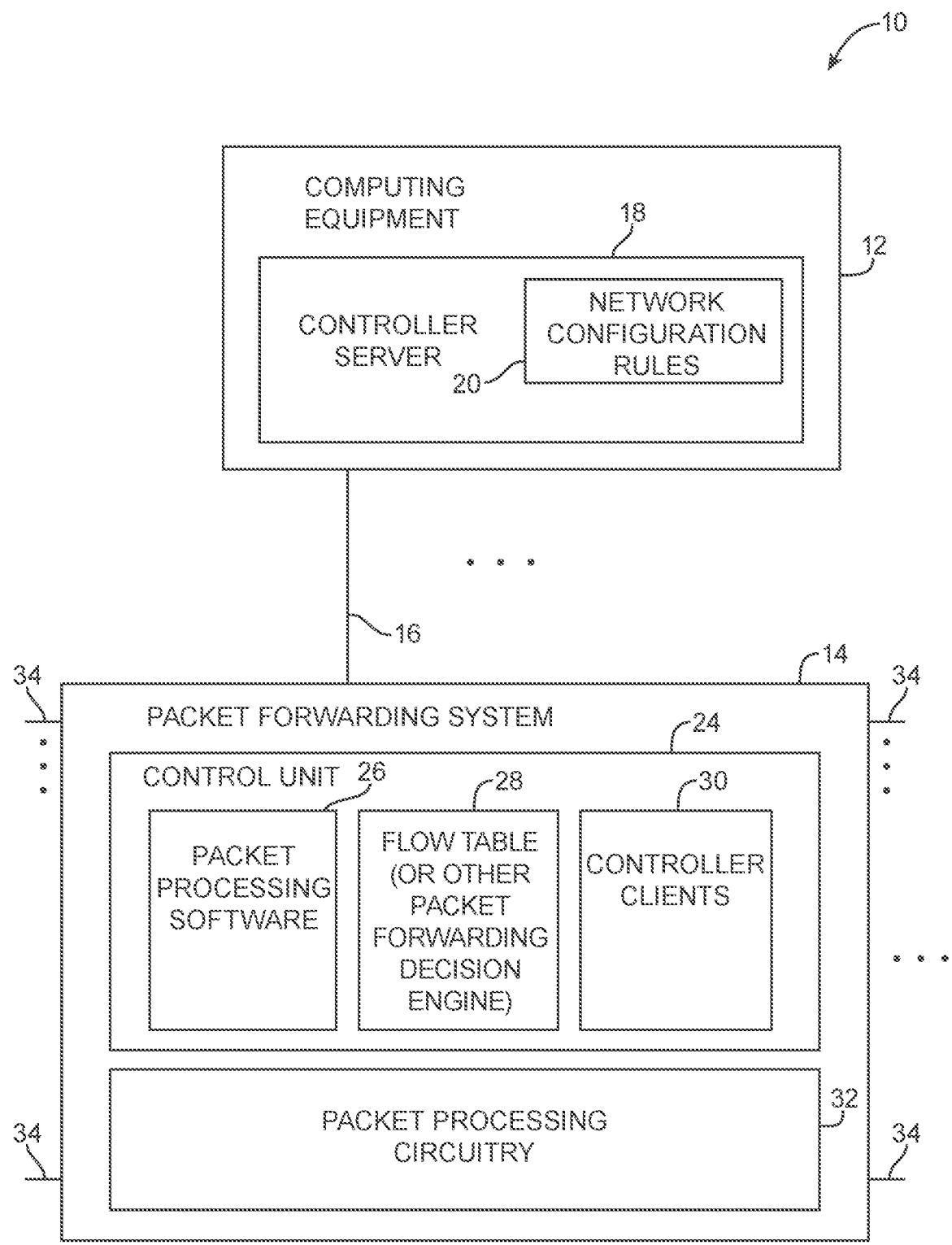
FIG. 1 is a diagram of an illustrative network that includes controller circuitry and a packet forwarding system in accordance with some embodiments.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Computing equipment 12 may include processing and memory circuits (e.g., one or more microprocessors, memory chips, non-transitory computer-readable storage media, and other control circuitry) for storing and processing control software (e.g., the functions of controller server 18). Controller server 18 can run on a single computer or can be distributed over several hosts for redundancy. The use of a distributed arrangement may help provide network 10 with resiliency against unexpected network partitions (e.g, a situation in which one or more network links between two network portions is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data (e.g., configuration data) to the hardware in network 10 (e.g., switch hardware) to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20 (e.g., network policy information, user input information). Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16. Each switch (e.g., each packet forwarding system) 14 may have input-output ports 34 (sometimes referred to as ports or network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, non-transitory computer-readable storage media, and other control circuitry) for storing and running control software, and may sometimes be referred to as control circuit 24. Control unit 24 may store and run software such as packet processing software 26 may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets is merely illustrative. If desired, any packet forwarding decision engine may be used in place of or in addition to flow tables 28 to assist packet forwarding system 14 to make decisions about how to forward network packets. As one particular example, packet forwarding decision engines may direct packet forwarding system 14 to forward network packets to predetermined ports based on attributes of the network packets (e.g., based on network protocol headers).

In general, the packet forwarding decision engine may perform an suitable type of processing (associated with any corresponding networking protocol) to assist packet forwarding system 14 in making forwarding decisions of network packets. Configurations in which a forwarding network includes switches storing flow tables usable in making switching, routing, and in general forwarding decisions are described herein as illustrative examples. The principles of the embodiments described herein may similarly be implemented in forwarding networks that include switches or network elements of other types (e.g., switches or packet forwarding systems that omit flow tables, switches or other network elements that utilize non-flow-table-based switching and routing schemes, switches or other network elements that utilize any suitable network switching or routing protocols, etc.).

In accordance with some illustrative embodiments described herein, any desired switch may be provided with controller clients that communicate with and are controlled by a controller server. For example, switch 14 may be implemented using a general-purpose processing platform that runs control software and that omits packet processing circuitry 32. As another example, switch 14 may, be implemented using control circuitry that is coupled to one or more high-speed switching integrated circuits ("switch ICs"). As yet another example, switch 14 may be implemented as a line card in a rack-based system having multiple line cards each with its own packet processing circuitry. Switch 14 may be implemented as commodity or white box switches, if desired. The controller server may, if desired, be implemented on one or more line cards in the rack-based system, in another rack-based system, or on other computing equipment (e.g., equipment separate from the rack-based system) that is coupled to the network.

Figure 2:
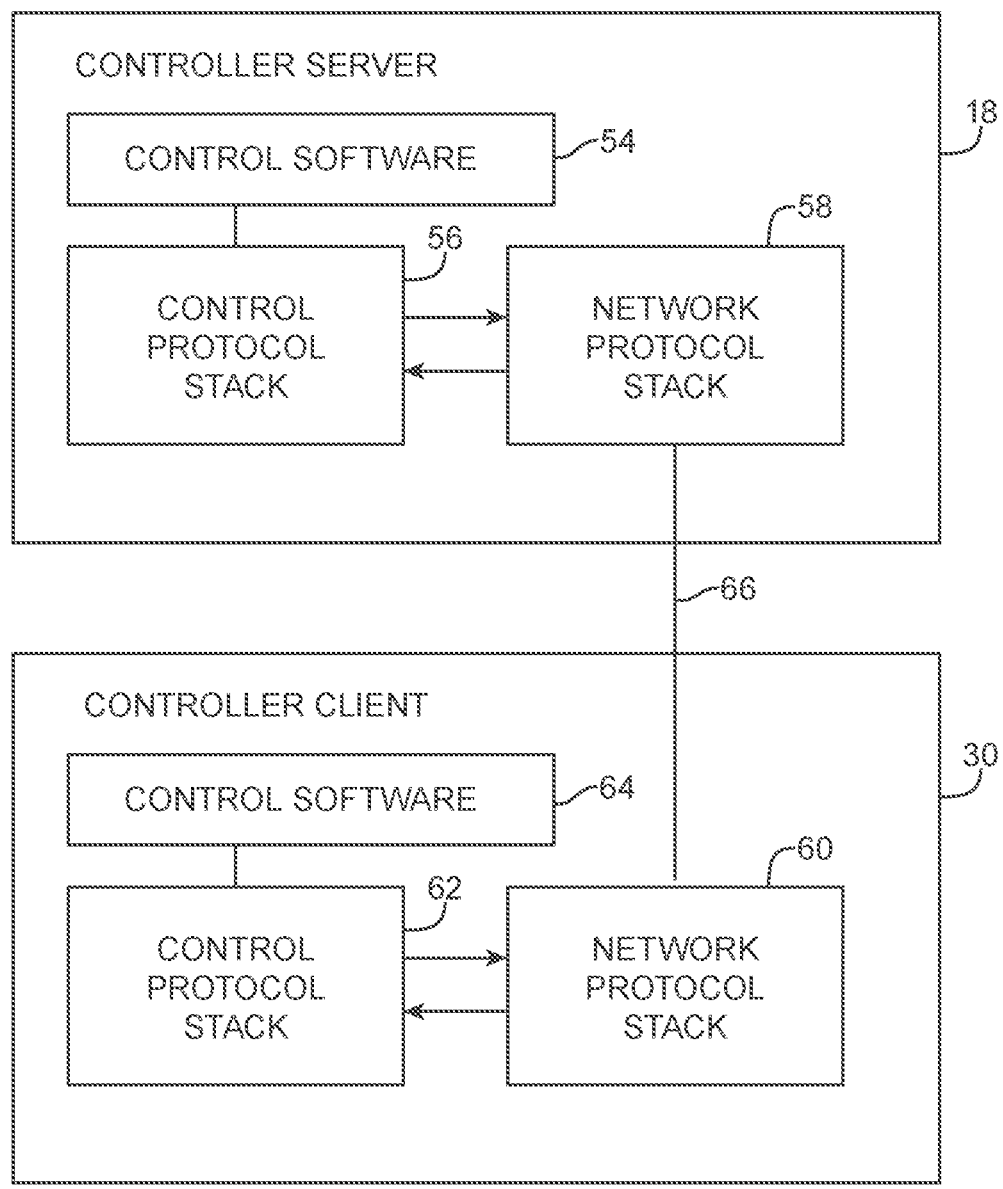
FIG. 2 is a diagram of a controller server and controller client that may communicate over a network connection in accordance with some embodiments.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stack 56 generates and parses control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Control protocols that may be used when communicating between controller server 18 and controller clients 30 over the network connection include SNMP and OpenFlow protocol (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 3:
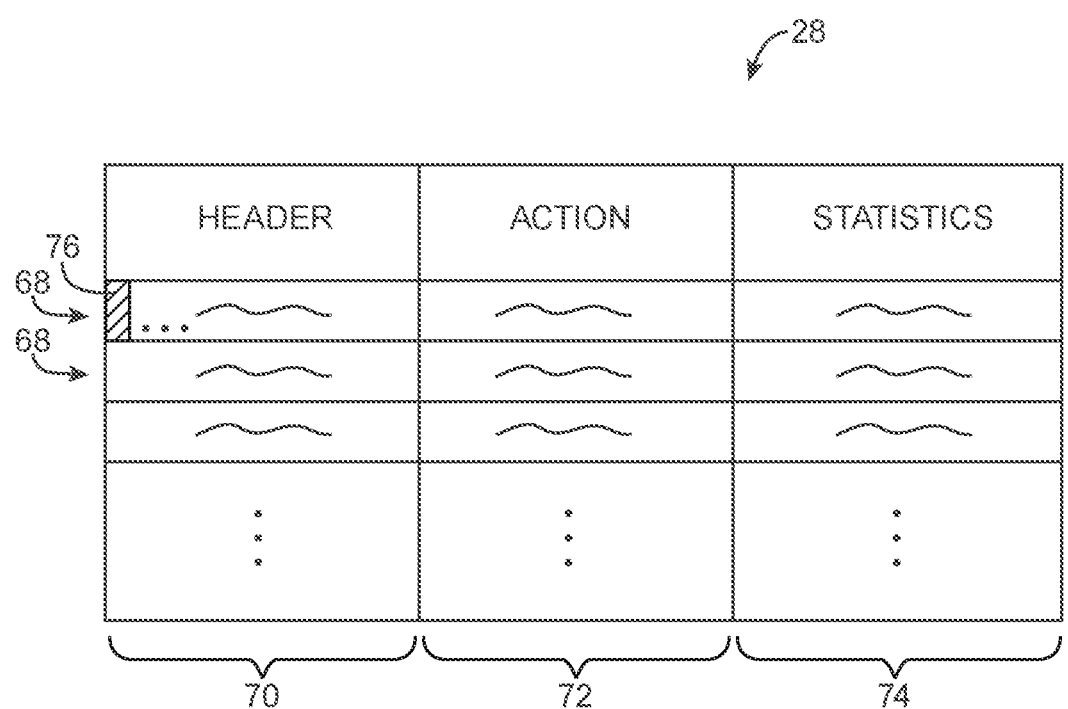
FIG. 3 is a diagram of an illustrative flow table of the type that may be used by a packet processing system in accordance with some embodiments.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. The modify-field actions may be used in rewriting portions of network packets that match the flow table entry.

FIG. 4 is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 4 table directs the switch in which the flow table entry is operating to perform Ethernet switching. In particular, incoming packets with matching Ethernet destination addresses are forwarded to port 3.

The entry of the second row of table of FIG. 4 illustrates how a switch may be configured to perform interact routing (i.e., packets are forwarded based on their destination IP address).

The third row of the table of FIG. 4 contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 5:
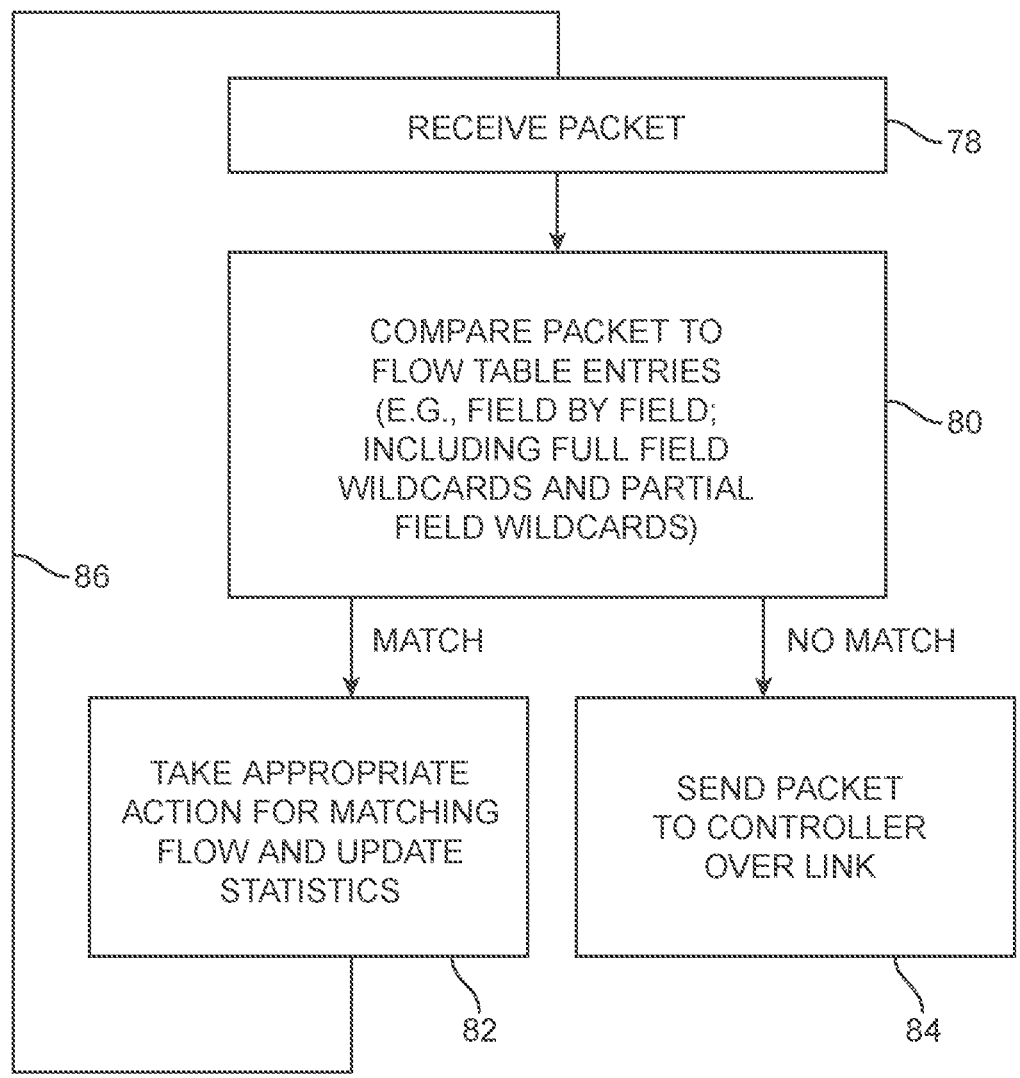
FIG. 5 is a flowchart of illustrative steps involved in processing packets in a packet processing system in accordance with some embodiments.

Illustrative steps that may be performed by switch 14 in processing packets that are received on input-output ports 34 are shown in FIG. 5. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14 as indicated by line 86.

Figure 6:
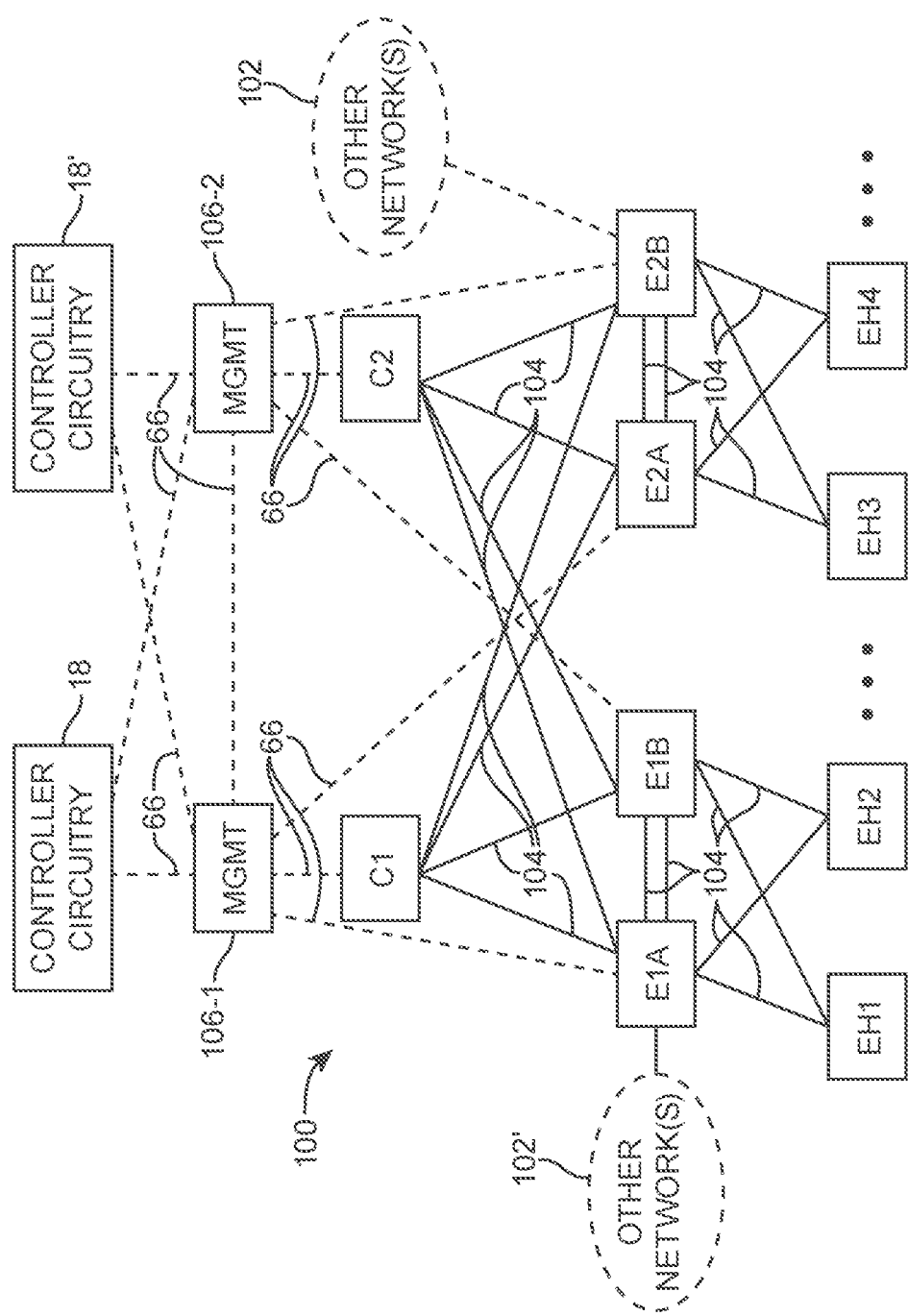
FIG. 6 is a diagram of an illustrative underlying network having two different tiers of switches that may be controlled by a controller for forwarding (e.g., routing) network packets between end hosts in accordance with some embodiments.
Figure 8:
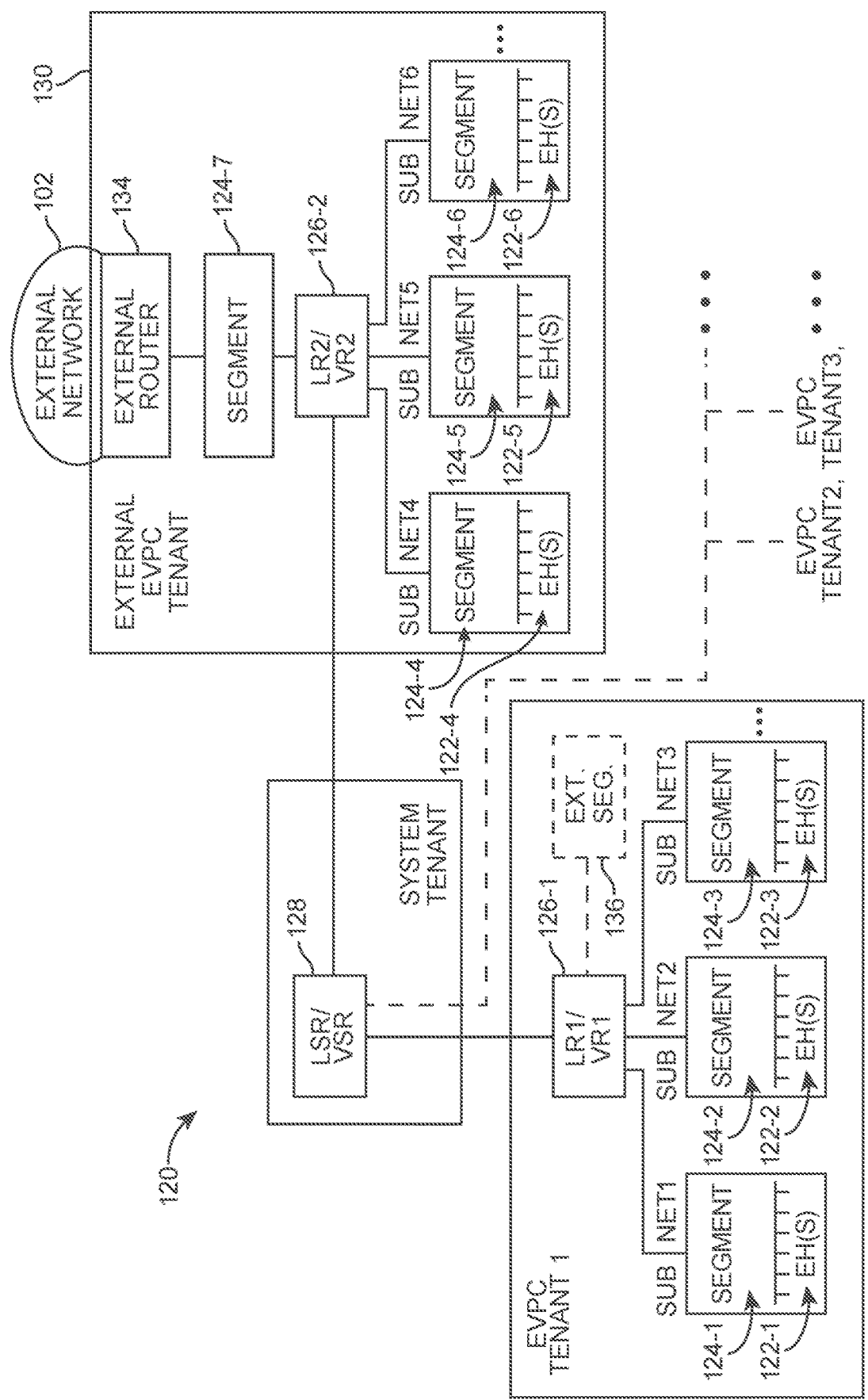
FIG. 8 is an illustrative network of virtual private cloud resources generated by a controller based on an underlying network in accordance with some embodiments.

FIG. 6 is a diagram of an illustrative network 100 in which switches may be controlled by a controller 18 (sometimes referred to herein as controller circuitry, management circuitry, a controller or management module, or a controller or management system). Controller 18 may be a controller server or a distributed controller implemented across multiple computing equipment. As shown in FIG. 8, network switches may be controlled by an active controller 18. If desired, a backup controller 18" may be activated and may provide back-up and/or auxiliary control when one or more portions of controller 18 is inactive (e.g., due to device failure, device diagnostics, etc.)

Controller 18 (or controller 18' when active) may provide control and configuration data (e.g., control signals, configuration data such as switch flow table entries, test packets, probe packets, etc.) for controlling network 100 to management devices 106-1 and 106-2 via paths 66. Switch management devices 106-1 and 106-2 may further distribute the control and configuration data across switches in network 100 via paths 66, each of which may be formed from a corresponding wired connection. If desired, management devices 106-1 and 106-2 may be physically separate from portions of controller 18 to more conveniently perform switch management functions. For clarity, management devices 106-1 and 106-2, may be considered to form a portion of controller 18, and are separately shown in FIG. 6 for illustrative purposes.

As shown in FIG. 6, network 100 may include switches C1, C2, E1A, E1H, E2A, and E2B. Controller 18 may be coupled to the switches of network 100 via control paths 66. Controller 18 may control the switches using control paths 66 (e.g., by providing flow table entries such as flow table entries 68 of FIG. 3). As described herein as examples, switches C1, C2, E1A, E1B, E2A, and E2B in network 100 may be configured in the manner described in connection with FIGS. 1-5.

Network 100 may include end hosts such as end hosts EH1, EH2, EH3, and EH4 that are coupled to the switches of network 100 (e.g., to switches E1A, E1B, E2A, and E2B). Switches that are directly coupled to end hosts may sometimes be referred to as edge switches or be referred to as leaf switches, whereas switches that merely interconnect other switches and are not directly coupled to the end hosts may be referred to as core switches or be referred to as spine switches. In the example of FIG. 6, switches E1A, E1B, E2A, and E2B are edge switches, because they are directly coupled to end hosts. Switches C1 and C2 are core switches, because switches C1 and C2 interconnect switches E1A, E1B, E2A, and E2B and E2B are not directly coupled to end hosts. Edge switches such as switch E2B (and/or switch E2A) may couple network 100 to other networks 102 (e.g., other networks including switches and end hosts, other networks external to network 100, the Internet, etc.). If desired, other networks 102' may be coupled to edge switch E1A (and/or E1B) in addition to or instead of other networks 102 coupled to edge switches E2A and/or E2B. In general, one or more other networks may be coupled to any suitable (edge) switch in network 100.

As shown in FIG. 6, switch C1 may be coupled to switches E1A, E1B, E2A, and E2B (at different corresponding ports of switch C1) via corresponding data paths 104 sometimes referred to herein as packet forwarding paths. Similarly, switch C2 may be coupled to each of the four edge switches (at different corresponding ports of switch C2) via corresponding data paths 104. These data paths 104 may couple corresponding edge switches to respective end hosts at different corresponding ports of the respective edge switches and may provide peer connections between edge switches. As shown in FIG. 6 control paths 66 in the control plane may be separate from the data paths 104 in the data plane. However, if desired, one or more portions of control paths 66 may include one or more portions of data paths 104.

Figure 7:
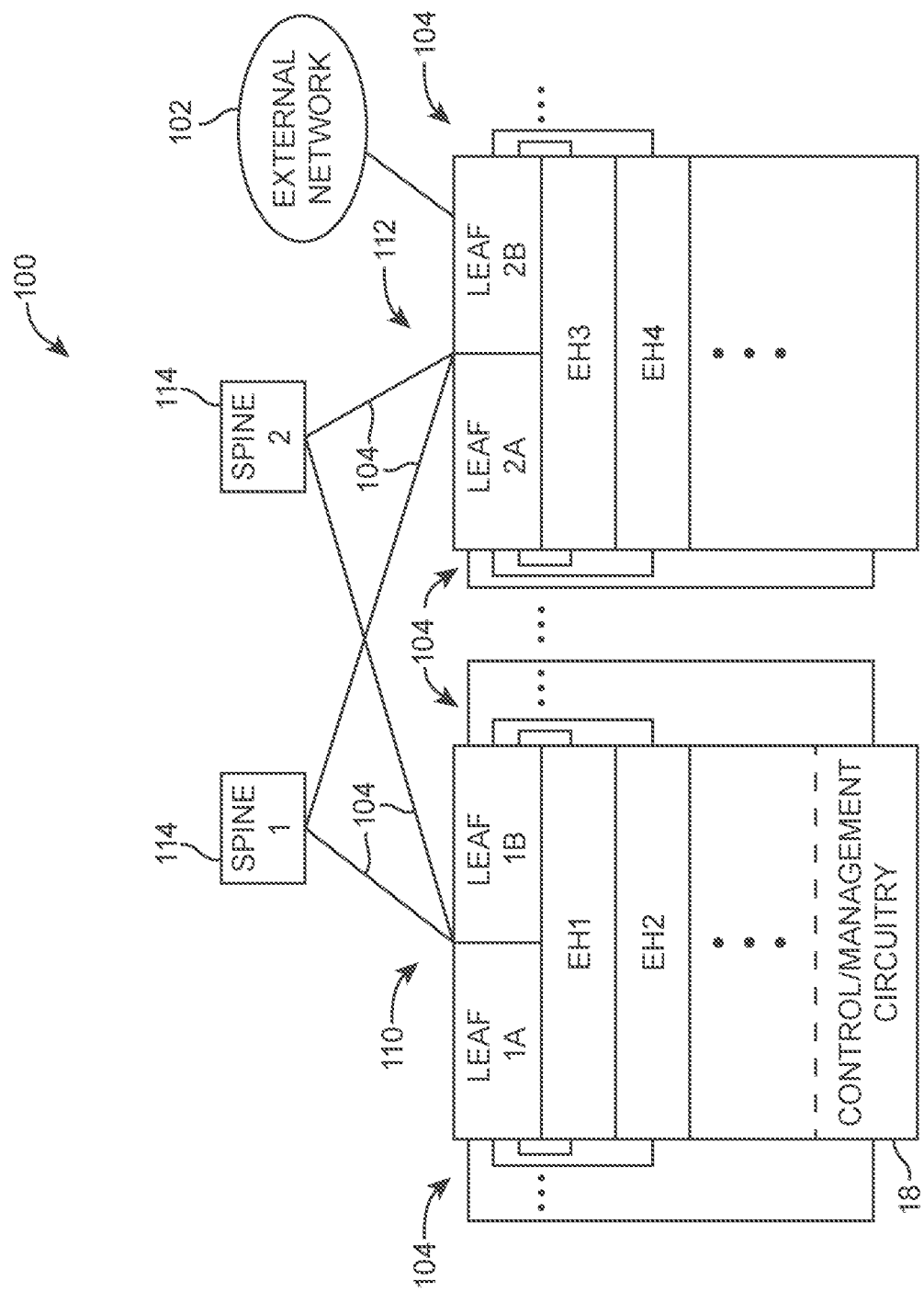
FIG. 7 is a diagram of an illustrative rack-based system that implements an underlying network having two different tiers of switches that may be controlled by a controller for forwarding (e.g., routing) network packets between end hosts in accordance with some embodiments.

FIG. 7 is an illustrative example of a network such as network 100 of FIG. 6 when implemented using a rack-based system. As shown in FIG. 7, leaf switches (referred to as edge switches in FIG. 6) and end hosts may be implemented using network racks 110 and 112 that are coupled to spine switches 114 (referred to as core switches in FIG. 6). If desired, network 100 may include additional network racks that house additional end hosts and switches, which are coupled to spine switches 114 or other spine switches. Network rack 110 may include leaf switches 1A and 1B and end hosts EH1 and EH2, whereas network rack 112 may include leaf switches 2A and 2B and end hosts EH3 and EH4. Leaf switches 2A, 1B, 2A, and 2B may serve as top-of-rack switches that are coupled via network paths to each end host of the corresponding network rack. For example, top-of-rack switch 2A may be connected to each of the end hosts of network rack 112 (e.g., end hosts EH3 and EH4, and other end hosts within network rack 112).

Each top-of-rack switch serves as an interface between end hosts of the corresponding network rack and other network devices such as other portions of network 100 or other networks 102 (e.g., external network 102 coupled to leaf switch 2B and/or other networks 102' coupled to leaf switches 1A in FIG. 6). Network traffic to or from end hosts of network rack 110 may be required to traverse at least one of the top-of-rack switches of network rack 110 (e.g., top-of-rack switches 1A and 1B). Similarly, network traffic of network rack 112 may be required to traverse at least one of switches 2A and 2B. As an example, network packets sent by end host EH1 to end host EH3 may be forwarded by top-of-rack switch 1A, spine switch 1, and top-of-rack switch 2A. As another example, network packets sent by end host EH1 to end host EH3 may be forwarded by top-of-rack switch 1B, spine switch 1, and top-of-ruck switch 2B.

If desired, switches may be implemented using computing equipment of network racks 110 and 112. In other words, one or more of leaf switches in network 100 may be implemented using one or more corresponding software switches. As an example, a software switch may be implemented using computing equipment such as an end host of network rack 110. The software switch may sometimes be referred to as a hypervisor switch. Hypervisor switches may be implemented using dedicated circuitry or using software on discrete computing equipment (e.g., on a line card). However, such software switches are coupled to the rest of the network by cables plugged into dedicated physical ports of the computing equipment on which the software switch is implemented.

The software switch may interface with end hosts in the corresponding rack (e.g., in the same rack in which the software switch is formed). In other words, shared computing equipment may be used to implement the software switch and the end hosts with which the software switch is interfaced. If desired, multiple end hosts may be implemented in software on the shared computing equipment. For example, tens, hundreds, thousands, or more end hosts may be implemented on the shared computing equipment and logically coupled in software to logical ports of the software switch, whereas the software switch is connected to other physical switches in network 100 by physical ports of the shared computing equipment on which the software switch itself is implemented.

If desired, controller 18 (e.g., controller circuitry 18 and/or management devices 106 may be implemented in network rack 110 (e.g., using the resources of a line card or other computing equipment of network rack 110). Controller 18 may communicate with the top-of-rack switches and core switches by sending control packets and receiving control plane packets from the switches. In this scenario, control paths 66 of FIG. 6 may traverse through one or more switches of network 100. For example, leaf switch 1A or 1B may serve as part of control paths between spine switches 1 and 2 and controller 18. As another example, leaf switches 1A and 1B, and spine switches 1 and 2 may serve as part of control paths between controller 18 and leaf switches 2A and 2B.

The network configurations of FIGS. 6 and 7 are merely illustrative. If desired, network 100 may include any number of spine and leaf switches coupled to any number of end hosts. If desired, one or more additional network racks (e.g., other than network racks 110 and 112) may be coupled to and may form portions of network 100.

In order to flexibly and efficiently forward (e.g., switch and/or route) network packets using switches in a network such as network 100. Network switches may include and store forwarding information (e.g., switching and/or routing information that enable network switches to form virtual (i.e., logical) resources overlaid onto the underlying network switches. In other words, each individual network switch may store information associated with one or more of these virtual resources, thereby enabling an inflexible network of underlying switches such as physical and/or software switches to implement a flexible network of virtual resources.

The information (e.g., configuration data, configuration settings, flow table entries, etc.) stored at the underlying switches may be flexibly updated based on control data (provided over a control plane) from a controller (e.g., based on user input to input-output circuitry for controller 18, the user input defining which and how these virtual resources are implemented). Even without substantial physical alternations to the underlying switches (e.g., the underlying physical network elements), a controller or management system may therefore control network switches in the network to form useful and adaptable virtual resources that fit the needs of a user.

In particular, with technological developments, virtual private clouds (VPCs) (e.g., a shared-tenancy cloud environment such as public or shared cloud infrastructure hosting VPCs for multiple unrelated entities have grown in popularity. However, for some applications, it may be useful to implement and provide VPCs and their associated organizational resources for on-premise private cloud or private infrastructure. To flexibly provide these organizational VPC resources and consequently on-premise VPCs, a controller such as controller 18 may control a number of underlying switches to form virtual sources such as these organizational resources associated with on-premise VPCs.

As examples, virtual resources such as segments, virtual routers (sometimes referred to herein as logical routers), and virtual system routers (sometimes referred to herein as logical system routers) may be used to implement these VPC resources. In particular, these virtual routers may be implemented by and may sometimes be referred to as a first set of routing tables stored at one or more switches or other network elements. Similarly, these virtual system routers may be implemented by and may sometimes be referred to as a second set of routing tables stored at one or more switches or other network elements. These virtual routers may include interfaces that are assigned and connect to corresponding subnets or segments, and virtual system routers may include interfaces that are assigned or connect to virtual routers or tenants. The interfaces for the virtual routers and virtual system routers may be referred to as corresponding associations in the corresponding routing tables in the sets of routing tables for the virtual routers and virtual system routers.

As shown in FIG. 8, a controller such as controller 18 (FIG. 6 or 7) may configure and control a network of underlying switches such as network 100 (FIG. 6 or 7) to implement and form an illustrative network of virtual resources for on-premise VPCs (e.g., network 120 of virtual resources). The underlying switches may include physical and/or software-based switches. If desired, network 120 may be updated over time to form any suitable virtual resources on the basis of physical connections in network 100. In particular, controller 18 may provide configuration and control data to the underlying switches with network 100 to map these virtual resources in network 120 onto the underlying switches (e.g., by assigning the identifying attributes of these virtual resources to the underlying switches).

Virtualized network 120 may include enterprise virtual private clouds (EVPCs) or EVPC tenants (sometimes referred to simply as VPC tenants). In particular, network 120 may include EVPC tenant 1, EVPC tenant 2, EVPC tenant 3, etc. As an example, EVPC tenants may each represent and host cloud resources for a given functional unit within the same enterprise or entity. As other more specific examples, the EVPC tenants may be implemented based on departmental structures, project structures, separate inter-related entities, functional structures, or based on any other suitable relationships.

Each EVPC tenant may include and/or define one or more network segments. As an example, EVPC tenant 1 may include segments 124-1, 124-2, and 124-3. Each segment within each EVPC tenant may be associated with (e.g., may be further partitioned into) at least one subnet (e.g., defined by a range of IP addresses). Each segment may be implemented to provide direct packet forwarding functions within that segment. In the example of FIG. 8, each of segments 124-1, 124-2, and 124-3 includes only one subnet and may provide direct packet forwarding functions between different end hosts (e.g., between end hosts in one of the sets of end hosts 122-1, 122-2, or 122-3) within the corresponding segment. If desired, each segment may include multiple subnets (e.g., each defined by a different subset of IP addresses).

Each segment may include ports that are each connected to a suitable number of end hosts within network 100 (e.g., one or more of end hosts EH1, EH2, EH3, EH4 in FIG. 6 or 7). These ports of each segment (sometimes referred to as virtual ports of that segment) may be distributed across ports of any suitable underlying physical and/or software switches. In other words, each segment may be implemented as a distributed switch across one or more underlying switches (e.g., a virtualized element having distributed processing modules across one or more underlying physical and/or software switches for implementing its functions). These segments may be defined by (e.g., may each have virtual ports assigned to) different network attributes of the corresponding connected end hosts (e.g., defined by protocol addresses or ranges of protocol address of the end hosts such as IP addresses, defined by hardware addresses or ranges of hardware addresses of the end hosts such as MAC addresses, defined by virtual local area network (VLAN) tags of the end hosts, and/or other network attributes of the end host).

In particular controller circuitry, such as controller 18 forming network 120, may identify or characterize a given end host by a MAC address of the given end host and/or a VLAN of the given end host, and may identify that the end host is coupled to a port of an underlying switch. Accordingly, to assign the given end host to a given segment, controller 18 may define a virtual port of the given segment using the MAC address of the given end host and/or the VLAN of the given end host (e.g., a virtual port may be a combination of a MAC address and a VLAN for the given end host). In other words, the given end host coupled to the port of the underlying switch may be assigned to the virtual port of the given segment. Similarly, any other virtual ports of the given segment may be formed from any other suitable end hosts and may be defined by desired network attributes of these end hosts (e.g., MAC addresses and VLANs). In such a manner, a group of end hosts coupled to ports of a set of underlying switches may be assigned to the virtual ports of the given segment.

As an example, segment 124-1 may include virtual ports respectively coupled to (e.g., formed in the manner described above from) end hosts 122-1 such as a first virtual port coupled to (e.g., formed from) end host EH1 (FIG. 7) associated with a first subnet within segment 124-1 and a second virtual port coupled to (e.g., formed from) end host EH4 (FIG. 7) associated with the first subnet within segment 124-1. In this example, a port of leaf switch 1A (FIG. 7) connected to end host EH1 may be associated with a first virtual port of the given segment 124-1 and a port of leaf switch 2B (FIG. 7) connected to end host EH4 may be associated with a second virtual port of the given segment 124-1. In such a manner, the given segment 124-1 may be distributed across multiple underlying network switches (e.g., leaf switches 1A and 2B). If desired, an underlying network switch may be assigned to multiple segments (e.g., different VLANs on different ports of the same underlying network switch may be associated with different segments).

Since segments may directly connect end hosts attached to different underlying switches, a controller (e.g., controller 18) may control multiple physical and/or software switches to exhibit control for a single segment. Analogously, exhibiting control for two different segments may involve controlling two different and potentially overlapping sets of underlying physical and/or software switches.

Arrangements in which EVPC tenants include segments for hosting, web servers, application servers, and database servers are described herein as illustrative examples. In particular, segment 124-1 in EVPC tenant 1 may be a web segment that includes one or more end hosts 122-1 implementing one or more web servers. Segment 124-1 may be configured to directly connect distributed web server resources (e.g., web server resources implemented by computing equipment on different network racks, web server resources connected to ports of different underlying physical and/or software switches, web server resources connected different ports of a same underlying switches, etc.). Segment 124-2 in EVPC tenant 1 may be an application segment that includes one or more end hosts 122-2 implementing one or more application servers. Segment 124-2 may be configured to directly connect distributed application server resources (e.g., application server resources implemented by computing equipment on different network racks, application server resources connected to ports of different underlying physical and/or software switches, application server resources connected different ports of a same underlying switches, etc.). Segment 124-3 in EVPC tenant 1 may be a database segment that includes one or more end hosts 122-3 implementing one or more database servers. Segment 124-3 may be configured to directly connect distributed database server resources (e.g., database server resources implemented by computing equipment on different network racks, database server resources connected to ports of different underlying physical and/or software switches, database server resources connected different ports of a same underlying switches, etc.).

As examples, the server resources for different segments may be implemented using virtual machines (e.g., implemented by computing resources of network racks 110 and 112, in FIG. 7), using dedicated hardware computers, and/or using any other suitable computing resources. In conjunction, these three segments and their associated server resources may be used to flexibly host web applications within each EVPC tenancy. While EVPC tenant 1 was described in details above, these three types of segments may be similarly implemented in EVPC tenants 2, 3, . . . , etc., if desired.

Each EVPC tenant may include a virtual router (sometimes referred to as a logical router (LR/VR)) that is connected to the one or more network segments in the corresponding EVPC tenant. A controller such as controller 18 for network 120 may implement the virtual router by assigning virtual router interfaces for the virtual router to corresponding IP domains associated with the one or more network segments in the corresponding EVPC tenant. As an example, EVPC tenant 1 may include virtual router 126-1. Virtual router 126-1 may include respective interfaces each assigned to (e.g., each connected to) a corresponding one of segments 124-1, 124-2, and 124-3 (e.g., each assigned to a corresponding subnet within EVPC tenant 1, etc.). Arrangements in which interfaces are defined by subnets are described herein as illustrative examples.

As shown in FIG. 8, segment 124-1 may be assigned to subnet 1, which is assigned to (e.g., connected to) a first interface of virtual router 126-1. Segment 124-2 may be assigned to subnet 2, which is assigned to (e.g., connected to) a second interface of virtual router 126-1. Segment 124-3 may be assigned to subnet 3, which is assigned to (e.g., connected to) a third interface of virtual router 126-1.

Configured in this manner, virtual routers (e.g., underlying switches implementing the virtual routers as configured by controller 18) such as virtual router 126-1 may perform network routing functions and provide isolation between the different segments (e.g., different subnets, different broadcast domains, etc.). In particular, to facilitate communication between different segments (e.g., within and/or external to a particular EVPC tenant), network routing functions performed by a virtual router may include modifying headers of network packets received at the virtual router interfaces.

As an example, the virtual router (e.g., an underlying switch implementing a function of the virtual router) may modify ethernet headers such as source and destination MAC address fields to corresponding to a desired segment (e.g., a desired subnet). In this example, each interface of the virtual router may be assigned a respective MAC address. The virtual router may rewrite the source MAC address field of the network packet to match an egress (i.e., outgoing)

interface of the virtual router and may rewrite the destination MAC address field of the network packet to match a next-hop address (e.g., a MAC address of a system router). In contrast to virtual routers, a segment connection may not perform any network routing functions based on IP domains (e.g., may perform network traffic forwarding functions based on MAC address domains).

Physically, virtual routers such as virtual router 126-1 may each be implemented as a virtualized element having distributed processing modules across one or more underlying physical and/or software switches for implementing its functions (e.g., formed from groups of underlying switches associated with the segments from which the virtual router is formed and based on which the corresponding virtual router interfaces are defined). A controller (e.g., controller 18) may control multiple physical switches to exhibit control for a single virtual router, and exhibiting control for two different virtual routers may involve controlling two different and potentially overlapping sets of underlying physical and/or software switches. In other words, the controller may provide configuration data to the underlying physical and/or software switches to define the virtual router interfaces (in addition to defining the previously mentioned virtual ports for segments) from the ports of the underlying physical and/or software switches. In such manner, a given underlying switch may serve as a portion of a virtual router (as well as a portion of a segment).

While described above in detail in connection with EVPC tenant 1, a corresponding virtual router 126 may be similarly implemented in each of EVPC tenants 2, 3, . . . , etc. All of these virtual routers 126 (e.g., in EVPC tenants 1, 2, 3, . . . , etc.) may include interfaces coupled to a virtual system router (sometimes referred to herein as a logical system router (LSR/VSR)). A controller such as controller 18 for network 120 may implement the virtual system router by assigning virtual system router interfaces to virtual routers (e.g., virtual router interfaces).

As shown in FIG. 8, network 120 may include a system VPC tenant having virtual system router 128. Virtual system router 128 may include respective interfaces each assigned to (e.g., connected to) one of virtual routers 126 (e.g., one of EVPC tenants 1, 2, and 3), thereby providing a Transit Gateway function between the EVPC tenants. Virtual system router may identify the corresponding virtual routers by their respective MAC addresses, by their respective data encapsulation schemes, by any other suitable schemes other than using IP addresses. In particular, virtual system router 128 may only be directly connected to (e.g., may only directly interact with) virtual routers 126 in network 120 (e.g., without being directly connected to end hosts, without directly interacting with segment virtual ports, without being directly connected to external routers, etc.).

Configured in this manner, a virtual system router (e.g., an underlying switch implementing a function of the virtual system router) such as virtual system router 128 may perform network routing functions and provide isolation between different EVPC tenants (e.g., between different functional VPC units within an entity). In particular, to facilitate communication between different EVPC tenants, network routing functions performed by a virtual system router may include modifying headers of network packets received at the virtual system router interfaces. As an example, the virtual system router may modify ethernet headers such as source and destination MAC address fields to corresponding to a desired virtual router (e.g., a desired EVPC tenant). In this example, each interface of the virtual system router may be assigned a respective MAC address.

The virtual system router may rewrite the source MAC address field of the network packet to match an egress (i.e., outgoing) interface of the virtual system router and may rewrite the destination MAC address field of the network packet to match a next-hop address (e.g., a MAC address of a virtual router).

In other words, a virtual system router such as virtual system router 128 may route data exclusively between different virtual routers (e.g., between different virtual router interfaces). In particular, an underlying switch processing the functions of the virtual system router may only interact directly with network packets associated with virtual router interfaces. If desired, the virtual system router may apply and enforce inter-tenancy network policies for routing packets between different EVPC tenants.

Physically, a virtual system router such as virtual system router 128 may be implemented as a virtualized element having distributed processing modules across one or more underlying physical and/or software switches for implementing its functions (e.g., formed from groups of underlying switches that are associated with the corresponding virtual routers from which the virtual system router is formed and based on which the corresponding virtual system router interfaces are defined). Analogously, a controller (e.g., controller 18) may control multiple physical switches to exhibit control for a single virtual system router, and exhibiting control for two different virtual system routers (if implemented) may involve controlling two different and potentially overlapping sets of underlying physical and/or software switches. In other words, the controller may provide configuration data to the underlying physical and/or software switches to define the virtual system router interfaces (in addition to defining the previously mentioned virtual ports for segments and virtual router interfaces) from the ports of the underlying physical and/or software switches. In such manner, a given underlying switch may serve as a portion of a virtual system router (as well as a portion of a segment and/or a virtual router).

It may be desirable to provide on-premise private cloud networks such as network 120 (e.g., EVPC tenants within these networks) with access to external networks such as the Internet or other external networks. As shown in FIG. 8, network 120 may include an external EVPC tenant 130. External EVPC tenant 130 may include segments 124-4, 124-5, and 124-6, each of which includes respective virtual ports associated to corresponding end hosts 122 (e.g, end hosts 122-4, 122-5, and 122-6). Segments 124-4, 124-5, and 124-6 may be assigned corresponding subnets (e.g., subnets 4, 5, and 6), each of which is assigned to an interface of virtual router 126-2. Details for operating, configuring, and/or implementing these elements may, be similar to those for operating, configuring, and/or implementing corresponding elements in EVPC tenant 1 described above and are omitted in order to not unnecessarily obscure the present embodiments.

In particular, in addition to virtual routers for EVPC tenants 1, 2, 3, . . . , etc. (sometimes referred to herein as internal EVPC tenants) being assigned to corresponding interfaces of virtual system router 128, virtual system router 128 may also have an interface assigned to (e.g., connected to) virtual router 126-2 for external EVPC tenant 130. External EVPC tenant 130 may include a connection to an end host such as external router 134 that provides access to an external network 102 (e.g., other networks 102 in FIG. 6 or 7), thereby providing an Internet Gateway functions for EVPC tenants within network 120. External router 134, in contrast with virtual routers 126, may be a physical router or gateway. In particular, external router 134 may exhibit similar behavior as and be treated as any other end hosts. External EVPC tenant 130 may provide a segment such as segment 124-7 to control traffic flow between network 120 and external network 102. In other words, segment 124-7 may include a virtual port assigned to the network attributes of external router 134 similar to any other virtual port assignment to end hosts as described in connection with EVPC tenant 1. If desired, segment 124-7 may include (e.g., implement) security features such as firewall devices, flow control features such as load balancing devices, and any other suitable features.

Configured in this manner, external EVPC tenant 130 may provide each of EVPC tenants 1, 2, 3, . . . , etc. with external network access (e.g., Internet access). In other words, virtual system routers 128 may regulate network traffic between external network 102 and each of internal EVPC tenants 1, 2, 3, . . . , etc. As an example, a controller (e.g., controller 18) may provide configuration data to implement different policies for each of internal EVPC tenants regarding external network access (e.g., regarding packet forwarding to virtual router 126-2 in external EVPC tenant 130), and vice versa.

If desired, instead of or in addition to implementing external EVPC tenant 130 having a segment virtual port assigned to an external router for external network access, a controller may implement a corresponding external segment in one or more of the internal EVPC, tenants for external network access. In the example of FIG. 8, a controller may implement external segment 136 with a virtual port assigned for direct external network access. Similar external segments may be implemented in the other internal EVPC tenants in FIG. 8 if desired.

The configuration of network 120 as shown in FIG. 8 is merely illustrative. If desired, any other suitable types of virtual private cloud resources in any suitable configuration maybe implemented based on an underlying network (e.g., network 100 or other network) using a controller (e.g., controller 18).

Figure 9:
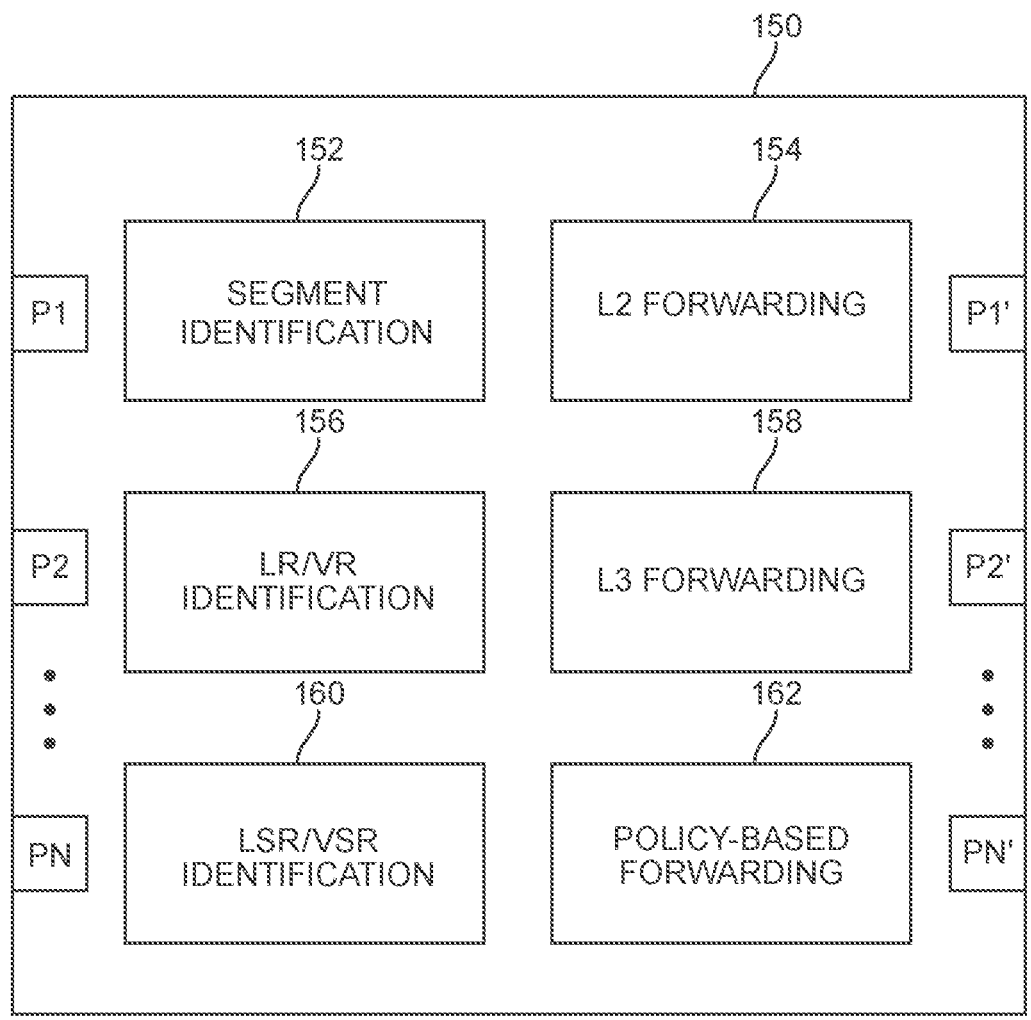
FIG. 9 is a diagram of an illustrative switch having modules that each performs different packet forwarding functions (e.g., switching functions and routing functions) in accordance with some embodiments.

In order to implement the illustrative virtual elements described in connection with FIG. 8 over underlying physical and/or software switches described in connection with FIG. 6 or 7, the underlying switches may be configured to implement packet forwarding operations (e.g., switching and/or routing functions). FIG. 9 is an illustrative block diagram of a switch 150 such as a physical or software switch that may store different types of configuration data for performing packet forwarding and routing based on virtual elements or resources as described in connection with FIG. 8. Switch 150 may, for example, be a leaf switch such as leaf switches 1A, 1B, 2A, or 2B of FIG. 7 (or a corresponding core switch in FIG. 6) or may be a spine switch such as spine switches 1 or 2 of FIG. 7 (or a corresponding core switch in FIG. 6). In other words, switch 150 may be an underlying switch, which includes circuitry for implementing the virtual elements described in connection with FIG. 8.

As shown in FIG. 9, switch 150 may include ports such as ports P1, P2, . . . , PN, P1', P2', . . . , PN', etc. (i.e., any suitable number of input ports, output ports, shared input-output ports, etc.). Switch 150 may include segment identification module 152, L2 forwarding module 154, logical or virtual router identification module 156, L3 forwarding module 158, logical or virtual system router identification module 160, and policy-based forwarding module 162. The modules may be implemented using respective dedicated circuitry, may be implemented using shared dedicated circuitry, or may be implemented using software processed on processing circuitry (e.g., by processing software instructions stored on memory circuitry such as non-transitory computer-readable storage media accessed by the processing circuitry). For example, these modules may be implemented using, packet processing software 26 on control unit 24 of FIG. 1 (e.g., processing packet processing software stored on memory circuits of control circuit 24) and/or packet processing circuitry 32. These modules may perform functions based on stored flow table entries or other configuration or control data provided by a controller such as controller 18.

A network packet received at one of the switch ports may be processed by one or more of the modules in determining how to forward the network packet. The modules may process the network packet in any desired sequence or in parallel. The operations performed by each module may be controlled by a controller such as controller 18.

Segment identification module 152 may determine a segment within a given EVPC tenant that a received network packet is assigned to. This may be determined based on network attributes associated with the network packet (e.g., incoming port, VLAN, source address information such as source MAC or IP address, etc.). As an example, the network attributes may be indicative of a virtual port of a segment the source end host is attached to. Module 152 may provide information identifying the segment (e.g., the segment virtual port) to L2 forwarding module 154. L2 forwarding module 154 may per network forwarding based on the segment information provided by module 152 (e.g., perform forwarding decisions at layer 2 of the Open Systems Interconnection (OSI) model). For example, L2 forwarding module 154 may determine an underlying physical or software switch port that the received network packet should be forwarded to. This may be determined based on the segment information and additional packet information such as a destination MAC address retrieved from the received network packet.

Configured with segment identification module 152 and L2 forwarding module 154, switch 150 (in combination with other similarly configured switches) may perform forwarding functions within a segment as described in connection with FIG. 8 (e.g., to implement the functions of segments 124-1, 124-2, 124-3, 124-4, 124-5, and 124-6 corresponding to different subnets in different EVPC tenants). As an illustrative example in connection with FIG. 8, a network packet sent from a first end host 122-1 in segment 124-1 and destined for a second end host 122-1 in segment 124-1 may be forwarded using segment identification module 152 and L2 forwarding module 152 in an intervening physical or software switch 150, which implements the segment forwarding functions of segment 124-1.

In scenarios such as when a destination end host of a received network packet is associated with a different subnet or segment than the source end host, switch 150 may use virtual router identification module 156 and L3 forwarding module 158 to performing muting operations. As an example in connection with FIG. 8, a network packet sent from end host 122-1 that is destined for end host 122-2 may be processed using L3 forwarding module 158, because end host 122-1 is assigned to a virtual port for segment 124-1, whereas end host 122-2 is assigned to a virtual port for segment 124-2. In other words, the IP domain (e.g., subnet 1) that is associated with end host 122-1 is different from the IP domain (e.g., subnet 2) that is associated with end host 122-2. In these scenarios, network routing at the IP layer (e.g., level 3 of the OSI model) may be required.

Virtual router identification module 156 may identify an associated EVPC tenant (e.g., a virtual router for the EVPC tenant) that should be used in controlling the network packet. Module 156 may use network attributes of the network packet along with information received from other modules of the switch. For example, module 156 may use identified EVPC segment information received from L2 forwarding module 154 along with IP address information retrieved from the network packet in determining which virtual router (for which EVPC tenant) controls the network packet. In particular, the segment information may identify virtual router interfaces of a virtual router that are assigned to the subnets associated with the IP address information from the network packets.

Virtual router identification module 156 may provide the identified EVPC tenant information (e.g., virtual router information) to L3 forwarding module 158. L3 forwarding module 158 may perform network routing operations based on the identified EVPC tenant information and based on additional information retrieved from the network packet. As an example, L3 forwarding module 158 may use IP header fields such as destination address fields to determine which port of switch 150 should be used in forwarding the network packet. In performing network routing operations, L3 forwarding module 158 may modify the network packet. For example, module 158 may decrement a (tinge-to-live) TTL header field and may rewrite layer 2 header fields such as source and destination MAC addresses.

As an illustrative example in connection with FIG. 8, a network packet sent from end host 122-1 in segment 124-1 of EVPC tenant 1 may be destined for end host 122-2 in segment 124-2 of EVPC tenant 1. In this example, the network packet may include the MAC address of end host 122-1 as a source MAC address, the MAC address of virtual router 126-1 as the destination MAC address (because end host 122-1 is coupled to a different L3 interface of virtual router 126-1 than end host 122-2 and may not have access to the MAC address of end host 122-2), the IP address of end host 122-1 as a source IP address, and the IP address of end host 122-2 as a destination IP address. Virtual router identification module 156 may determine that the source end host 122-1 is within segment 124-1 coupled to the subnet 1 interface of virtual router 126-1. L3 forwarding module 158 may determine that destination end host 122-2 is within segment 124-2 and is coupled to the subnet 2 interface of virtual 126-1 VR1, and may perform network routing operations in routing the network packet to end host 122-2 via the subnet 2 interface of virtual router 126-1 (e.g., based on flow table entries provided by a controller). The network routing operations may include decrementing a TTL field of the network packet and rewriting the source and destination MAC addresses of the network packet. In particular, the source MAC address may be rewritten from the MAC address of end host 122-1 to the MAC address of the subnet 2 interface of virtual router 126-1, whereas the destination MAC address may be rewritten from the MAC address of the subnet 1 of virtual router 126-1 to the MAC address of end host 122-2.

Switch 150 may include policy-based forwarding module 162 that may process the network packets after the packets have been processed by L2 forwarding module 154 and/or L3 forwarding module 158 (e.g., packets may be passed to module 162 prior to passing the packets to an egress port on switch 150). Module 162 may serve as an override to forwarding modules 154 and 158 in determining which port to route data packets to. Module 162 may perform network routing and network access control operations based on network policy rules identified by controller 18 and information retrieved from the network packet.

If desired, switch 150 may also include virtual system router identification module 160 that identifies a virtual system router should be used in controlling the network packet. The virtual system router identification module may identify which virtual system router should be used in controlling the network packet and may use network attributes of the network packet along with information received from other modules of the switch. The virtual system router identification module may provide virtual system router information to L2 forwarding module 154, L3 forwarding module 158, and/or policy-based forwarding module 162. Modules 154, 158, and 162 may perform network routing operations based on the identified virtual system router information and based on information retrieved from the network packet.

In scenarios such as when a destination end host of a received network packet is associated with an EVPC tenant (e.g., a different virtual router) than the source end host switch 150 may use virtual system router identification module 160 (and L2 forwarding module 154 and/or policy-teased forwarding module 162) for performing forwarding operations. As an example, in connection with FIG. 8, a network packet sent from end host 122-1 in segment 124-1 of EVPC tenant 1 may be destined for end host 122-4 in segment 124-4 of external EVPC tenant 130. In other words, the EVPC tenancy associated with end host 122-1 is different from the EVPC, tenancy associated with end host 122-4. In these scenarios, network routing at a virtual system router level may be required. In particular, any suitable network attributes may be used to identify the different virtual system router interfaces at which the corresponding virtual routers 126-1 and 126-2 are connected, thereby providing, the appropriate forwarding between different EVPC tenants.

Referring back to module 162 in FIG. 9, controller 18 (FIG. 6 or 7) may be used to apply and enforce network policy rules at virtual ports of the virtual network such as network 120 in FIG. 8 (e.g., virtual ports of distributed segments, interfaces of distributed virtual routers, or interface of virtual system routers). Network policy rules may include network routing rules (sometimes referred to herein as policy-based routing (PBR) rules) that help determine network paths between end hosts and may include access control lists that allow or block selected network traffic. If desired, controller 18 may receive access control list and/or network routing rules from a user as the network policy rules (e.g., the user may specify an access control list and network routing rules simultaneously to controller 181. Controller 18 may provide forwarding rules implementing the access control list policy rules and network routing rules as flow table entries or as other types of control and configuration data) for implementation on module 162 of switches 150.

In general, any desired network attributes such as one or more virtual ports, virtual router and system router interfaces, physical ports and/or packet header fields may be identified in an access control list to specify a suitable policy for network 100 in FIG. 6 or 7 and for virtual network 120 in FIG. 8. Controller 18 may generate flow table entries for the underlying switches in network 100 that implement the network policy rule defined by such an access control list.

The flow table entries may be provided to one or more physical or hypervisor switches in implementing the access control list (e.g., for implementation on module 162 of switch 150 as shown in FIG. 9). In scenarios where the access control list is combined with a policy-based routing entry that is provided by a user, flow table entries having an action field for forwardin2 the data packet to a desired destination may also be generated. If desired, flow table entries implemented on switch 150 for module 162 may process data packets after the packets have been processed by L2 forwarding module 154 and/or L3 forwarding module 158. If desired, module 162 may override the forwarding determinations made at modules 154 and 158.

If desired, a user may specify an access control list and policy-based routing rules liar each segment, for each EVPC tenant, and/or for a system VPC tenant on virtual network 120 in FIG. 8 independently. As an example, a user may specify a first set of access control rules and policy-based routing rules within each different segment within each corresponding EVPC tenant (e.g., to allow, restrict, and/or otherwise control network flow between pairs of virtual ports within the corresponding segment). As another example, a user ma-y specify a second set of access control rules and policy-based routing rules across different segments within each corresponding EVPC tenant (e.g., to allow, restrict, and/or otherwise control network flow between different interfaces of a virtual routers for the corresponding EVPC tenant). As yet another example, a user may specify a third set of access control rules and policy-based routing rules across different EVPC tenants (e.g., to allow, restrict, and/or otherwise control network flow between different interfaces of a virtual system router for the system VPC tenant). By independently providing access control and routing rules for each these on-premises VPC resources, a network administrator may operate the underlying network with improved flexibility and efficiency.

The modules of the switch 150 may collectively implement a flow table such as flow table 28. For example, flow table entries operating only on layer 2 header fields may be implemented using (e.g., may be stored at) segment identification module 152 and L2 forwarding module 154. As another example, flow table entries operating only on layer 3 header fields may be implemented using (e.g., may be stored at) virtual router identification module 156 and L3 forwarding module 158. As yet another example, flow table entries operating on both layer 2 and layer 3 header fields may be implemented using (e.g., stored at) segment identification module 152, L2 forwarding module 154, virtual router identification module 156 and L3 forwarding module 158. Flow table entries implemented on (e.g., stored at) virtual system router identification module 160 and policy-based routing module 162 may operate on any desired fields of the received packets.

The example of FIG. 9 in which modules 152, 154, 156, 158, 160 and 162 are implemented separately is merely illustrative. If desired, the functions of any two or more modules may be merged and implemented using shared circuitry. The modules may be implemented as software modules in a software switch such as a hypervisor switch or may be implemented using dedicated circuitry. Each switch 150 may be capable of performing both network forwarding and network routing, which helps to allow a controller to implement distributed network segments, virtual routers, and virtual system routers. If desired, one or more of these modules may be omitted from one or more of switches 150. If desired, a first switch in a network may be configured to implement the functions of traffic forwarding within segments and the functions of packet routing for virtual routers between different segments, and a second switch in the network may be configured to implement the functions of packet routing for a virtual system router between virtual router.

Figure 10:
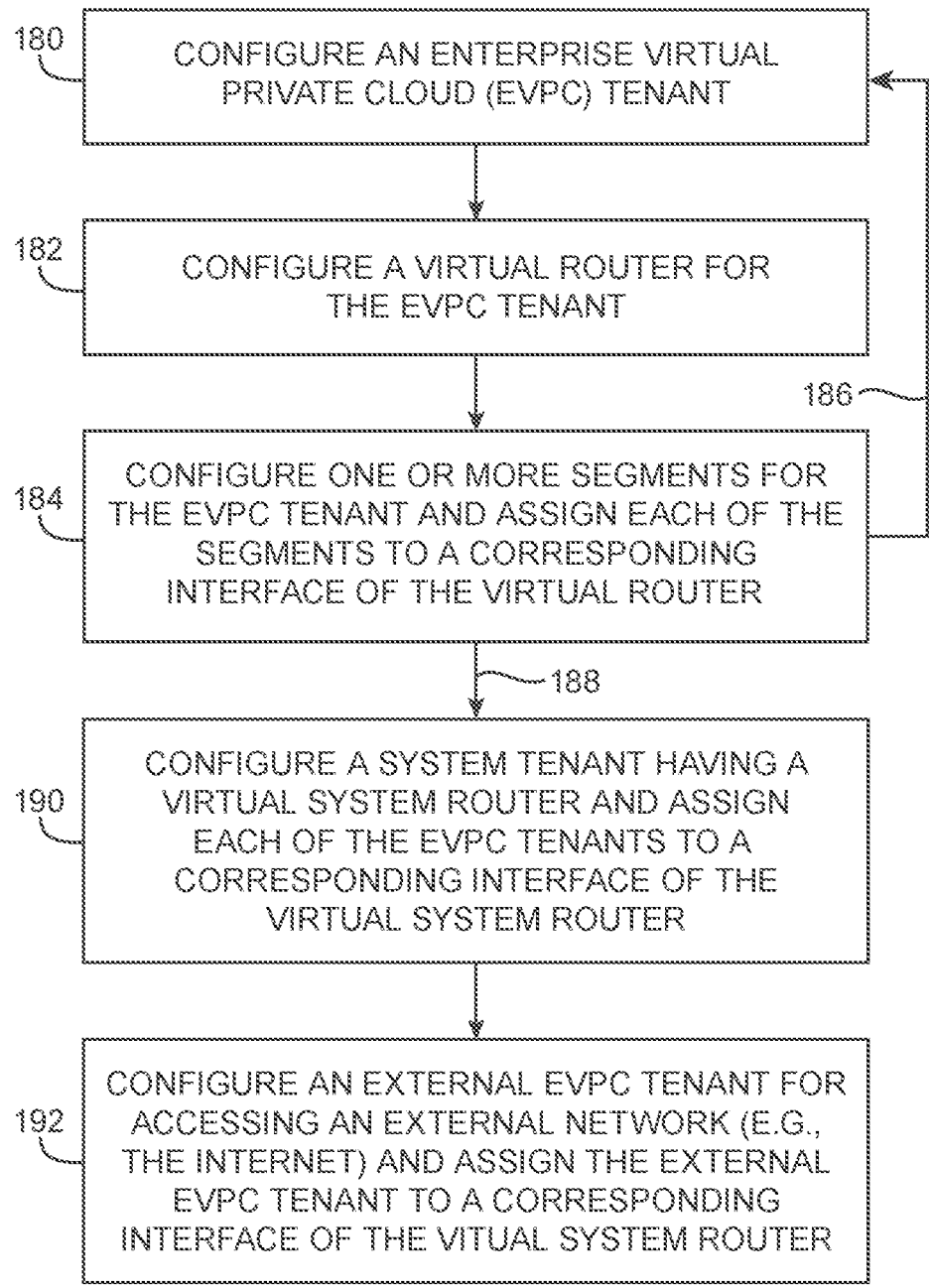
FIG. 10 is a flowchart of illustrative steps for implementing virtual private cloud resources in accordance with some embodiments.

FIG. 10 is an illustrative flowchart for forming, configuring, and/or otherwise implementing virtual private cloud features in a network such as network 100 (FIG. 6 or 7). In particular, implementing these virtual private cloud features may include implementing enterprise virtual private cloud (EVPC) tenants, virtual routers within the EVPC tenants, segments, network segments, a system tenant, a virtual system router within the system tenant, external EVPC tenants, external network router connections in the external EVPC tenant, etc.

One or more the steps in FIG. 10 may be performed at a controller such as controller 18 (FIG. 6 or 7) based on corresponding virtual private cloud configuration data received at the controller (e.g., configuration information received from a user). If desired, one or more of the steps in FIG. 10 may be performed at one or more underlying switches configured to receive configuration and control data (e.g., flow table entries) from the controller for implementing these virtual private cloud resources based on the configuration data. In each of these cases, corresponding storage (e.g., non-transitory computer-readable storage media) for controller 18 (e.g., in computing equipment 12 in FIG. 1) and for one or more switches (e.g., control unit 24 in FIG. 1) may be configured to store corresponding software instructions for performing one or more steps in FIG. 10. Corresponding processing circuitry for controller 18 (e.g., in computing equipment 12 in FIG. 1) and for one or more switches (e.g., in control unit 24 in FIG. 1) may be configured to process these software instructions (e.g., configured to perform One or more steps in FIG. 10).

As shown in FIG. 10, at step 180, a controller such as controller 18 may configure an EVPC tenant (sometimes referred to as a VPC tenant). In particular, the controller may be configured to implement an EVPC tenant based on parameters and configuration information specified by user input, by default templates, etc.

At step 182, the controller may configure a virtual router for the EVPC tenant. In particular, based on the received user input or other predetermined settings for creating the EVPC tenant, the controller may generate configuration and control data (e.g., flow table entries) for one or more underlying physical and/or software switches (e.g, switches described in connection with FIGS. 6 and 7). The underlying switches may receive the configuration and control data at their corresponding modules (e.g, modules as described in connection with FIG. 9).

At step 184, the controller may configure one or more segments for the EVPC tenant and may assign each of the segments to a corresponding interface of the virtual router. In particular, the controller may be configured to implement and assign one or more segments associated with the EVPC tenant (e.g., based on receiving user input and/or predetermined settings). As examples, the user input or settings may define one or more subnets for each of the segments, may define virtual router interface connections for each of the segments (or subnets), may define end host connections to each of the segments (e.g., virtual port connections for the segment), and any other suitable parameters. Based on the user input or other settings for creating and defining the segments, the controller may generate configuration and control data (e.g., flow table entries) for one or more underlying physical and/or software switches. The underlying switches may receive the configuration and control data at their corresponding modules (e.g., modules as described in connection with FIG. 9).

Based on the configuration and control data generated in steps 182 and 184, the underlying switches may form a virtual router that performs L3 forwarding between different segments within the EVPC tenant (e.g., by using flow table entries for virtual router identification module 156, L3 forwarding module 158, and policy-based routing module 162). Based on the configuration and control data generated in steps 182 and 184, the underlying switches may also form segments associated with respective subnets within which L2 forwarding is performed (e.g., by using flow table entries for segment identification module 152 and L2 forwarding module 154, and policy-based routing module 162).

After step 184, processing may optionally loop back via path 186 to step 180, and steps 180, 182, and 184 may be performed any additional number of times to implement multiple sets of EVPC tenants, each having a virtual router with interfaces associated with corresponding segments in the EVPC tenant. After a suitable number of EVPC tenants with corresponding virtual resources in desired configuration have been implemented, processing may proceed to step 190.

At step 190, the controller may configure a system tenant that includes a virtual system router and may assign each of the EVPC tenants (e.g., each of the virtual routers for the corresponding EVPC tenants) to a corresponding interface of the virtual system router. In particular, the controller may be configured to implement a virtual system router (e.g., based on receiving user input and/or predetermined settings). As examples, the user input, or settings may define parameters for a system tenant and a virtual system router, virtual system router interface connections to each of EVPC tenants, and any other suitable user input. Based on the user input or other settings for creating and defining the system tenant and virtual system router, the controller may generate configuration and control data (e.g., flow table entries) for one or more underlying physical and/or software switches. The underlying switches may receive the configuration and control data at their corresponding modules (e.g., modules described in connection with FIG. 9). Based on the configuration and control data generated in step 190, the underlying switches may form a virtual system router that perform routing between EVPC tenants, and more specifically, between virtual routers for corresponding EVPC tenants (e.g., by using flow table entries for virtual system router identification module 160, L2 forwarding module 154, policy-based routing module 162, and for any other suitable modules).

At step 192, the controller may configure an external EVPC tenant for accessing an external network such as the Internet and may assign the external EVPC tenant (e.g., the virtual router for the external EVPC tenant to a corresponding interface of the virtual system router. In particular, the controller may be configured to implement the external EVPC tenant and an external router connection (e.g., based on user input or predetermined settings). The controller may generate configuration and control data (e.g., flow table entries) for underlying physical and/or software switches to implement the virtual resources for the external EVPC tenant (e.g., to generate a virtual router coupled to a virtual system router interface, to generate segments coupled to corresponding virtual router interfaces, end host assignments to each of the segments, etc.).

If desired, in addition to step 192 or instead of step 192, the controller may configure an external segment (e.g., in step 184) in the internal EVPC tenant for external network access (e.g., through an physical external router end host). The external segment may be separately defined and may provide exclusive external network access for the internal EVPC tenant (e.g., separate from external network access for any other internal EVPC tenant).

The steps of FIG. 10 are merely illustrative. If desired, one or more steps may be omitted and/or replaced, the order of these steps may be modified, and any other suitable modifications may be made to the steps of FIG. 10. As a particular example, new EVPC tenants, and new segments within existing EVPC tenants may be implemented at any suitable time, (e.g., after step 190, after step 192, etc.) if desired. In general, any suitable modifications to the VPC resources may be made at any suitable time.

The foregoing is merely illustrative of the principles of this invention and various modifications can be made by those skilled in the art without departing from the scope and spirit of the invention.

What is claimed is:

1. A networking system comprising:
   switches coupled between a plurality of end hosts; and
   a controller coupled to the switches and configured to:
      form a plurality of virtual private cloud tenants based on providing configuration data to the switches, and
      form a system virtual private cloud tenant based on providing additional configuration data to the switches, wherein the plurality of virtual private cloud tenants includes an external virtual private cloud tenant having an external network connection and internal virtual private cloud tenants, and wherein the system virtual private cloud tenant is configured to route network traffic between at least one of the internal virtual private cloud tenants and the external network connection through the external virtual private cloud tenant.

2. The networking system defined in claim 1, wherein the configuration data and the additional configuration data comprises flow table entries stored at the switches.

3. The networking system defined in claim 2, wherein the controller is configured to form a corresponding virtual router for each virtual private cloud tenant in the plurality of virtual private cloud tenants, and the virtual routers are implemented in a distributed manner across the switches.

4. The networking system defined in claim 3, wherein the controller is configured to form a virtual system router for the system virtual private cloud tenant, and the virtual system router is implemented in a distributed manner across the switches.

5. The networking system defined in claim 4, wherein the external network connection connects the virtual router for the external virtual private cloud tenant to an external network router.

6. The networking system defined in claim 5, wherein the external network router comprises a physical router connected to the Internet.

7. The networking system defined in claim 6, wherein the switches comprise a switch selected from the group consisting of a physical switch or a software switch implemented using computing equipment.

8. The networking system defined in claim 1, wherein the controller is configured to form a network segment for at least an additional one of the internal virtual private cloud tenants, the network segment having an additional external network connection.

9. A method of operating controller circuitry to control a network implemented in a system, the network including a plurality of underlying switches and the method comprising:
   with the controller circuitry, controlling the plurality of underlying switches to form a first virtual private cloud tenant having a first virtual router implemented on at least one switch in the plurality of underlying switches;

with the controller circuitry, controlling the plurality of underlying switches to form a second virtual private cloud tenant having a second virtual router implemented on at least one switch in the plurality of underlying switches; and with the controller circuitry, controlling the plurality of underlying switches to form a system virtual private cloud tenant having a virtual system router with first and second interfaces connected respectively to the first and second virtual routers.

10. The method defined in claim 9, further comprising:

with the controller circuitry, controlling the plurality of underlying switches to form a segment within the first virtual private cloud tenant implemented on at least one switch in the plurality of underlying switches.

11. The method defined in claim 10, wherein the segment is associated with a first subnet and is connected to an interface of the first virtual router.

12. The method defined in claim 11, wherein the plurality of underlying switches comprises a switch including a segment identification module, and wherein controlling the plurality of underlying switches to form the segment comprises providing configuration data that identifies virtual ports of the segment distributed across ports of the plurality of underlying switches to the segment identification module.

13. The method defined in claim 12, wherein the switch includes a hardware address-based forwarding module configured to forward network packets within the segment.

14. The method defined in claim 13, wherein the switch includes a virtual router identification module, and wherein controlling the plurality of underlying switches to form the first virtual private cloud tenant having the first virtual router comprises providing configuration data that identifies the interface of the first virtual router to the virtual router identification module.

15. The method defined in claim 14, wherein the switch includes an Internet Protocol address-based forwarding module configured to route network packets across the first virtual private cloud tenant.

16. The method defined in claim 15, wherein the switch includes a virtual system router identification module, and wherein controlling the plurality of underlying switches to form the system virtual private cloud tenant having the virtual system router comprises providing configuration data that identifies the first and second interfaces of the virtual system router to the virtual system router identification module.

17. The method defined in claim 16, wherein the switch includes a policy-based forwarding module configured to route network packets across the network.

18. A non-transitory computer-readable storage medium comprising instructions for:

configuring switches coupled between a plurality of end hosts to form a virtual private cloud tenant by configuring the switches to form a network segment associated with a subnet and by configuring the switches to form a virtual router that includes an interface associated with the network segment; and configuring the switches to form a system tenant by configuring the switches to form a virtual system router that includes an interface associated with the virtual router.

19. The non-transitory computer-readable storage medium defined in claim 18, further comprising instructions for:

configuring the switches to form an external virtual private cloud tenant by configuring the switches to form an additional virtual router that includes an interface for external network access.

20. The non-transitory computer-readable storage medium defined in claim 19, further comprising instructions for:

configuring the switches to form a first additional network segment associated with a first additional subnet within the virtual private cloud tenant; and configuring the switches to form a second additional network segment associated with a second additional subnet within the virtual private cloud tenant, wherein the network segment is connected to a first end host implementing an applications server, the first additional network segment is connected to a second end host implementing a web server, and the second additional network segment is connected to a third end host implementing a database server.

* * * * *